United States Patent [19] [11] 4,395,516
Imai et al. [45] Jul. 26, 1983

[54] THERMOPLASTIC RESIN COMPOSITIONS COMPRISING COPOLYMER OF UNSATURATED DICARBOXYLIC ACID ANHYDRIDE AND VINYL AROMATIC MONOMER, ABS, AND METHYLMETHACRYLATE POLYMER

[75] Inventors: Tatuhiko Imai; Akira Ohi, both of Sakai, Japan

[73] Assignee: Daicel Chemical Industries, Ltd., Osaka, Japan

[21] Appl. No.: 332,892

[22] Filed: Dec. 21, 1981

[30] Foreign Application Priority Data

Dec. 26, 1980 [JP] Japan .................................. 55/186163

[51] Int. Cl.³ ...................... C08L 55/02; C08L 25/08; C08L 33/12
[52] U.S. Cl. ........................................... 525/71; 525/74
[58] Field of Search .................................. 525/74, 71

[56] References Cited
U.S. PATENT DOCUMENTS 3,642,949 2/1972 Stafford et al. ....................... 525/74
4,108,925 8/1978 Lee ........................................ 525/74
4,167,543 9/1979 Liebig et al. ......................... 525/74
4,197,376 4/1980 Lee et al. ............................. 525/74
4,234,701 11/1980 Abolins et al. ..................... 525/74
4,305,869 12/1981 Lee et al. ............................ 525/74

Primary Examiner—Carman J. Seccuro
Attorney, Agent, or Firm—Flynn, Thiel, Boutell & Tanis

[57] ABSTRACT

A thermoplastic resin composition having improved heat resistance, impact resistance and molding properties comprises a resin mixture of:

(A) 5–95 wt. % of a polymer containing an unsaturated dicarboxylic anhydride and a vinyl aromatic compound and optionally a vinyl cyanide compound, an alkyl acrylate or methacrylate monomer and/or a rubber, (B) 95–5 wt. % of ABS resin containing 2–70 wt. % of a rubber component, and further containing and (C) 0.1–20 wt. %, per 80–99.9 wt. % of the sum of (A)+(B), of a modified thermoplastic acrylic resin which is a copolymer or a multi-stage polymer containing at least 20 wt. % of methyl methacrylate.

10 Claims, No Drawings

THERMOPLASTIC RESIN COMPOSITIONS COMPRISING COPOLYMER OF UNSATURATED DICARBOXYLIC ACID ANHYDRIDE AND VINYL AROMATIC MONOMER, ABS, AND METHYLMETHACRYLATE POLYMER

The present invention relates to a thermoplastic resin composition having excellent mechanical strength and improved molding properties without reduced thermal resistance.

Copolymers of styrene and maleic anhydride produced in the prior art have a high transparency and thermal resistance. However, the impact resistance of those polymers is poor. For overcoming this defect, a method comprising blending the copolymer with ABS resin or a polycarbonate resin has broadly been employed.

However, the blend of the copolymer comprising styrene and maleic anhydride with ABS resin has a reduced thermal resistance. The blend of said copolymer with the polycarbonate resin is more expensive than the above blend with ABS resin, though it has an improved heat resistance and, therefore, the amount thereof is limited in actual use. Further, in those blends, the resins are not highly compatible with one another and, therefore, flow marks are frequently observed on the surfaces of the molded articles. Thus, problems are posed when they are used for the production of motorcar parts and light electrical appliance parts of which a good appearance is required.

After intensive investigations made for the purpose of overcoming the above defects, the inventors have found that, surprisingly, if a mixture of styrene/maleic anhydride copolymer and ABS resin is blended with a modified thermoplastic acrylic resin, the molding properties thereof can be remarkably improved while the impact resistance and heat resistance thereof are not deteriorated.

The present invention relates to a thermoplastic resin composition having excellent impact resistance, heat resistance and molding properties which comprises:

(i) 5-95 wt.% of a polymer (component A) comprising an unsaturated dicarboxylic anhydride, a vinyl aromatic compound and, if necessary, a vinyl cyanide or an alkyl acrylate or methacrylate monomer; or a rubber-modified copolymer (component A') comprising the above component A and 2-50 wt.% of a rubber, (ii) 5-95 wt.% of ABS resin (component B), containing 2-70 wt.% of a rubber component, and (iii) 0.1-20 wt.% of a modified thermoplastic acrylic resin (component C) which is a copolymer or a multistage polymer containing at least 20% of methyl methacrylate, wherein component C is contained in an amount of 0.1-20 wt.% based on the sum of components A, B and C. It is considered that the effects of the present invention are obtained for the following reasons.

If ABS resin obtained by the emulsion polymerization method is used as a component of the blend, the product is considerably colored yellow due to an emulsifier or an agent used for the salting-out in the production thereof, though the molded article has an excellent surface gloss, since the rubber graft polymer particles are dispersed in the resin phase in the form of fine particles of less than about $0.3\mu$. Further, the rubber graft polymer particles in the ABS resin are not dispersed well in the styrene/maleic anhydride copolymer. Compatibility of both resin phases with each other is poor. Therefore, considerable flow marks are caused.

If ABS resin obtained by the mass suspension polymerization method is used, the resulting resin is scarcely colored. However, since the rubber graft polymer particles in the ABS resin have a diameter of generally about $0.7\mu$, larger than that of the emulsification polymerization product, the molded article has a surface gloss inferior to that of an emulsion polymerization product. In addition, the gloss is uneven, whereby the appearance of the molded article is seriously degraded. Even if a blend of the ABS resin obtained by the emulsion polymerization and the ABS resin obtained by the mass suspension polymerization in a specific ratio is used for overcoming the defects of the respective ABS resins, the problem of flow marks on the molded article cannot completely be overcome.

On the other hand, if the modified thermoplastic acrylic resin (component C) of the present invention is blended in a mixture of above components A and B, a polar group of component C exhibits a quite high compatibility with each of the resin phases of components A and B. Therefore, when a molten molding material comprising the composition of the present invention is allowed to flow into a mold of a molding machine, the skin layer thereof is not broken and the flow is uniform to form a flow mark-free molded article.

Component A of the composition of the present invention contains 5-50 wt.% of an unsaturated dicarboxylic anhydride and 50-95 wt.% of a vinyl aromatic compound as indispensable components and, if necessary, 0-30 wt.%, based on the whole component A, of a vinyl cyanide compound, an alkyl acrylate or methacrylate monomer and/or 0-50 wt.% of a rubber component as optional component(s). In case the rubber component is contained therein, it can be produced particularly by mass polymerization, solution polymerization or emulsion polymerization. One or more of the above optional components may be contained therein. In case the rubber component is contained, rubber component content of component A as a whole is preferably 2-50 wt.%.

As for the proportion of acrylonitrile, butadiene and styrene in ABS resin (B), the butadiene rubber content of ABS resin (B) should be 2-70 wt.% but the amounts of the other compounds may be determined in the same manner as in the prior art. ABS resin (B) may be prepared by any known method such as mass polymerization, solution polymerization, suspension polymerization or emulsion polymerization method. Component (C) is available on the market or it may be prepared by a conventional method.

The monomers constituting the composition of the present invention are as follows. The unsaturated dicarboxylic acid anhydride in component A includes maleic anhydride. The vinyl aromatic compounds include styrene and $\alpha$-methylstyrene. The vinyl cyanide compounds include acrylonitrile and methacrylonitrile. The alkyl acrylates and methacrylates include methyl and ethyl esters of acrylic and methacrylic acids. As monomers other than methyl methacrylate in component C, there may be mentioned alkyl acrylates wherein the alkyl group having 1-18 carbon atoms is particularly ethyl, butyl, octyl or stearyl group. It also includes a rubber component.

The above components may be blended together by a known method. If additives such as a colorant, for example, a pigment, a lubricant, plasticizer or antioxidant are incorporated therein, such additives can be homogeneously dispersed therein to form a blend having a uniform color tone and stable physical properties. High molecular weight molecules other than components A, B and C may be blended in the composition of the present invention without deteriorating the properties thereof.

The following examples will further illustrate the present invention, in which amounts of the additives are shown by parts by weight or percentages by weight, unless otherwise stated.

Physical properties of the products were measured by the following methods:

Melt flow rate: Melt flow rate was determined from a melt flow index measured by means of a 1 mm$\phi$ nozzle at 230° C. under 5 Kg according to ASTM D 1238.

Izod impact strength: Izod impact strength was measured at 20° C. and 65% RH with thick notch according to ASTM D-256.

Heat distortion temperature: Heat distortion temperature was measured according to ASTM D 648.

Surface gloss: Surface gloss of a test piece (color plate having a size of 50 mm×90 mm×3 mm) was measured at an angle of incidence of 60° according to ASTM D 523-62T.

Flow marks: Appearance of a molding (plate having a width of 50 mm, length of 90 mm and three thicknesses of 1 mm, 2 mm and 3 mm) was judged visually.

The components used in the examples of the present invention were prepared as follows:

REFERENTIAL EXAMPLE A-1

Styrene/maleic anhydride copolymer

Dylark 332 (a product of Arco Polymers Co.) which is a copolymer of styrene/maleic anhydride in a weight ratio of 85/15 was used. This copolymer will be referred to as copolymer A-1.

REFERENTIAL EXAMPLE A'-1

Rubber-modified styrene/maleic anhydride copolymer

Dylark 250 (a product of Arco Polymers Co.) which is a rubber-modified copolymer of styrene/maleic anhydride was used. Dylark 250 is an impact resistant styrene/maleic anhydride copolymer comprising 15% of rubber, 15% of maleic anhydride and 85% of styrene. This copolymer will be referred to as copolymer A'-1.

REFERENTIAL EXAMPLE B-1

Graft copolymer obtained by emulsion polymerization (ABS resin)

35 Parts (on solid base) of polybutadiene latex (Nipol LXMA; a product of Nippon Zeon Co.), 72 parts of styrene, 28 parts of acrylonitrile, 20 parts of disproportionated sodium rhodinate, 0.2 part of potassium persulfate, 1.0 part of t-dodecylmercaptan and 200 parts of water were charged in a 120 l reaction vessel and allowed to react at 50° C. for 6 hours under stirring in nitrogen stream. The thus-obtained latex was solidified in an ordinary manner, washed with water and dried to obtain a white, powdery resin. This resin will be referred to as resin B-1.

REFERENTIAL EXAMPLE B-2

Graft copolymer obtained by suspension polymerization (ABS resin)

The following compounds were charged in a 120 l reaction tank provided with an intensive stirring structure according to the following recipe.

| | |
|---|---|
| Styrene | 62 parts |
| Styrene/butadiene copolymer rubber (Tufdene 2000 A, a product of Asahi Kasei Kogyo Co., Ltd.) | 10 |
| Benzoyl peroxide | 0.15 |
| Dicumyl peroxide | 0.08 |
| tert-Dodecylmercaptan | 0.30 |

After the rubber components were completely dissolved, the reaction mixture was heated to 70° C. and the mass polymerization was carried out for 4 hours. Then, 10 parts of styrene and 0.15 part of tert.dodecylmercaptan were added thereto and the whole was stirred for 10 minutes.

The reaction mixture was transferred the another closed type reaction vessel containing a previously prepared aqueous dispersion comprising 100 parts of water, 4 parts of magnesium hydroxide and 0.05 part of sodium laurate. The whole was stirred to form a suspension.

Thereafter, the temperature was elevated to 120° C. and suspension polymerization was effected for 5 hours. Thus obtained polymer particles were cooled. The dispersing agent was decomposed with hydrochloric acid. The particles were washed with water and dried. The copolymer thus obtained will be referred to as copolymer B-2.

REFERENTIAL EXAMPLE B-3

Graft copolymer obtained by the suspension polymerization (ABS resin)

A copolymer B-3 was prepared in the same manner as in Referential Example 2, except that the following starting materials were used.

| | |
|---|---|
| Styrene | 35 parts |
| α-Methylstyrene | 26 |
| Acrylonitrile | 26 |
| Styrene-butadiene copolymer rubber (Tufdene 2000 A) | 13 |
| Benzoyl peroxide | 0.47 |
| Dicumyl peroxide | 0.15 |
| tert-Dodecylmercaptan | 0.05 |

REFERENTIAL EXAMPLE C-1

Modified thermoplastic acrylic resin

The modified thermoplastic acrylic resins are copolymers and multi-stage polymers containing at least 20% of methyl methacrylate. They can be prepared by a conventional method or are available on the market. The modified thermoplastic acrylic resins include, for example, the following resins:

(i) Terpolymers comprising an acrylate, styrene and diene rubber backbone:
  (a) "Acryloid KM-653" (a product of Rohm & Haas Co.)
  (b) "Kane Ace FM" (a product of Kanegafuchi Chemical Industry Co.)
(ii) Acrylate/styrene copolymer:

(a) "Acryloid KM-330" (a product of Rohm & Haas Co.)

(iii) Completely acrylic polymer:

(a) "Kane Ace PA-20" (a product of Kanegafuchi Chemical Industry Co.)

The above four resins will be referred to as resins C-1.

The above resins A-1 through B-2 were shaped into pellets by means of an extruder having a diameter of 40 m/m. From the pellets, test pieces were prepared by means of an injection molding machine (cylinder temperature: 225°–240° C., injection pressure: 800–900 Kg/cm², mold temperature: 50° C.). Physical properties and characteristic features of the test pieces were examined to obtain the results shown in Table 1.

EXAMPLE 1

C-1 were used. A copolymer of styrene/maleic anhydride was homogeneously blended with ABS resin. The blend was kneaded in an extruder. Thus obtained pellets were molded under substantially the same conditions and physical properties of the resulting test pieces were examined. The compositions and results are shown in Table 2.

It is understood from the results that the modified thermoplastic acrylic resin solves the problem of flow marks on the molded article without degrading the impact resistance or thermal resistance of the mixture of styrene/maleic anhydride copolymer and ABS resin. As for the modified thermoplastic acrylic resins, the completely acrylic polymer had greater effects than the acrylate/styrene/diene rubber backbone terpolymer or the acrylate/styrene copolymer.

TABLE 1

| Item | Unit | Test method (ASTM) | A-1 | A'-1 | B-1 | B-2 | B-3 |
|---|---|---|---|---|---|---|---|
| Izod impact strength | Kg-cm/cm | D-256 with notch | 1 | 7 | 40 | 10 | 8 |
| Heat distortion temp. | °C. | D-648 Load 18.56Kg/cm² | 107 | 94 | 83 | 89 | 92 |
| Surface gloss | | D-523-62T | — | 75 | 90 | 80 | 80 |
| Melt flow rate | g/10mins. | D-1238 230° C., 5 Kg | 5 | 3.5 | 2 | 12 | 2 |
| Remarks | | | mass suspension polymerization | mass polymerization | emulsion polymerization | mass suspension polymerization | mass suspension polymerization |

The resin obtained in Referential Example A-1 and resins obtained in Referential Examples B-1 through

TABLE 2

| Test No. | Resin composition | | | | | Izod impact strength with ¼" notch Kg-cm/cm | Heat distortion temp. °C. | Surface gloss | Melt flow rate g/10 min. | Flow marks ** |
|---|---|---|---|---|---|---|---|---|---|---|
| | A-1 | B-1 | B-2 | B-3 | C-1 | | | | | |
| 1 | 40 | 60 | — | — | — | 6 | 91 | 90 | 3 | x |
| 2 | 40 | — | 60 | — | — | 6 | 95 | 85 | 6 | x |
| 3 | 40 | 40 | 20 | — | — | 11 | 95 | 90 | 5.5 | x |
| 4 | 40 | 60 | — | — | 2*¹ | 6 | 90 | 90 | 3 | Δ |
| 5 | 40 | — | 60 | — | 2*¹ | 6 | 94 | 85 | 6 | Δ |
| 6 | 40 | 40 | 20 | — | 2*¹ | 11 | 94 | 90 | 5.5 | Δ |
| 7 | 40 | 40 | 20 | — | 2*² | 11 | 94 | 90 | 5.5 | Δ |
| 8 | 40 | 40 | 20 | — | 2*³ | 11 | 94 | 90 | 5.5 | Δ |
| 9 | 40 | 40 | 20 | — | 2*⁴ | 11 | 94 | 90 | 5.0 | o |
| 10 | 20 | 80 | — | — | — | 21 | 87 | 90 | 2 | x |
| 11 | 20 | — | 80 | — | — | 10 | 89 | 80 | 6 | x |
| 12 | 20 | 60 | 20 | — | — | 25 | 89 | 90 | 5 | x |
| 13 | 20 | 80 | — | — | 2*² | 21 | 86 | 90 | 2 | Δ |
| 14 | 20 | — | 80 | — | 2*² | 10 | 88 | 80 | 6 | Δ |
| 15 | 20 | 60 | 20 | — | 2*² | 25 | 88 | 90 | 5 | Δ |
| 16 | 20 | 60 | 20 | — | 2*⁴ | 25 | 88 | 90 | 4.5 | o |
| 17 | 40 | 40 | 20 | — | 10*² | 13 | 87 | 91 | 4.0 | Δ |
| 18 | 40 | 40 | 20 | — | 15*² | 17 | 85 | 91 | 3.5 | o |
| 19 | 40 | 40 | 20 | — | 10*⁴ | 14 | 87 | 91 | 1.5 | o |
| 20 | 40 | 40 | 20 | — | 15*⁴ | 15 | 86 | 91 | 1.0 | o |
| 34 | 40 | 40 | — | 20 | — | 12 | 97 | 90 | 4 | x |
| 35 | 40 | 40 | — | 20 | 2*⁴ | 12 | 96 | 90 | 4 | o |
| 36 | 20 | 30 | — | 50 | — | 11 | 92 | 90 | 2 | x |
| 37 | 20 | 30 | — | 50 | 2*⁴ | 11 | 92 | 90 | 2 | o |

*¹"Acryloid KM 330" (a product of Rohm & Haas Co.)
*²"Acryloid KM 653" (a product of Rohm & Haas Co.)
*³"Kane Ace FM" (a product of Kanegafuchi Chemical Industry Co.)
*⁴"Kane Ace PA-20" (a product of Kanegafuchi Chemical Industry Co.)
*⁵Criteria of flow marks:
o: No flow mark
Δ: Slight flow marks,
x: Remarkable flow marks.

EXAMPLE 2

The same procedure as in Example 1 was repeated except that the styrene/maleic anhydride copolymer was replaced with a rubber-modified styrene/maleic anhydride copolymer.

Physical properties of the resulting test pieces were examined. The compositions and results are shown in Table 3.

TABLE 3

| Test No. | Resin composition A'-1 | B-1 | B-2 | B-3 | C-1 | Izod impact strength with ⅛" notch Kg-cm/cm | Heat distortion temp. °C. | Surface gloss | Melt flow rate g/10 min. | Flow marks ** |
|---|---|---|---|---|---|---|---|---|---|---|
| 21 | 40 | 60 | — | — |  | 15 | 81 | 85 | 2 | x |
| 22 | 40 | — | 60 | — |  | 13 | 85 | 80 | 5 | x |
| 23 | 40 | 40 | 20 | — |  | 20 | 85 | 85 | 4.5 | xx |
| 24 | 40 | 60 | — | — | 2*1 | 15 | 80 | 85 | 2 | Δ |
| 25 | 40 | — | 60 | — | 2*1 | 13 | 84 | 80 | 5 | Δ |
| 26 | 40 | 40 | 20 | — | 2*1 | 20 | 84 | 85 | 4.5 | Δ |
| 27 | 40 | 40 | 20 | — | 2*2 | 20 | 84 | 85 | 4.5 | Δ |
| 28 | 40 | 40 | 20 | — | 2*3 | 20 | 84 | 85 | 4.5 | Δ |
| 29 | 40 | 40 | 20 | — | 2*4 | 20 | 84 | 85 | 4.0 | o |
| 30 | 40 | 40 | 20 | — | 10*2 | 26 | 83 | 86 | 3.5 | Δ |
| 31 | 40 | 40 | 20 | — | 15*2 | 30 | 81 | 86 | 3.0 | o |
| 32 | 40 | 40 | 20 | — | 10*4 | 24 | 83 | 86 | 1.0 | o |
| 33 | 40 | 40 | 20 | — | 15*4 | 28 | 82 | 86 | 0.5 | o |
| 38 | 40 | 40 | — | 20 | — | 23 | 88 | 85 | 4 | x |
| 39 | 40 | 40 | — | 20 | 2*4 | 23 | 87 | 85 | 4 | o |
| 40 | 20 | 30 | — | 50 | 2 | 18 | 90 | 85 | 2 | x |
| 41 | 20 | 30 | — | 50 | 2*4 | 18 | 89 | 85 | 2 | o |

It is understood from the above results that the problem of flow marks on the molded articles can be solved by the modified thermoplastic acrylic resin without degrading the impact resistance or heat resistance of the mixture of styrene/maleic anhydride copolymer and ABS resin. As for the modified thermoplastic acrylic resins, the completely acrylic polymer had greater effects than the acrylate/styrene/diene rubber backbone terpolymer or acrylate/styrene copolymer.

What is claimed is:

1. A thermoplastic molding composition which consists essentially of a blend of
   (A) from 5 to 95 wt. % of a copolymer consisting essentially of
      (1) from 5 to 50 wt. % of an unsaturated dicarboxylic acid anhydride,
      (2) from 50 to 95 wt. % of a vinyl aromatic monomer,
      (3) from 0 to 30 wt. % of a vinyl cyanide monomer, alkyl acrylate monomer or alkyl methacrylate monomer, and
      (4) from 0 to 50 wt. % of a rubber
   (B) from 5 to 95 wt. % of an ABS resin containing from 2 to 70 wt. %, based on said ABS resin, of a butadiene rubber, and
   (C) from 0.1 to 20 wt. %, per 80 to 99.9 wt. % of the sum of the amounts of (A) plus (B), of thermoplastic acrylic resin different from (A) and (B) and which is a copolymer or multi-stage polymer containing at least 20 wt. % of methyl methacrylate, based on said acrylic resin.

2. A composition as claimed in claim 1, wherein said ABS resin (B) has been polymerized by bulk-suspension polymerization.

3. A composition as claimed in claim 1, wherein said copolymer (A) is a copolymer of styrene and maleic anhydride.

4. A composition according to claim 1, wherein said unsaturated dicarboxylic acid anhydride is maleic anhydride.

5. A composition according to claim 1, wherein said vinyl aromatic monomer is selected from the group consisting of styrene and α-methylstyrene.

6. A composition according to claim 1, wherein said vinyl cyanide monomer is acrylonitrile or methacrylonitrile, said alkyl acrylate monomer is methyl acrylate or ethyl acrylate, and said alkyl methacrylate monomer is methyl methacrylate or ethyl methacrylate.

7. A composition according to claim 1, wherein said resin (C) consists essentially of units of said methyl methacrylate, units of one or more members selected from the group consisting of alkyl acrylates, wherein the alkyl group has 1 to 18 carbon atoms, and a rubber.

8. A composition according to claim 7, wherein the alkyl group of said alkyl acrylates is selected from ethyl, butyl, octyl and stearyl.

9. A composition according to claim 1, wherein said copolymer (A) contains 2 to 50 wt. % of said rubber.

10. A resin composition as claimed in claim 1, wherein said resin (C) consists of units of said methyl methacrylate and units of one or more members selected from the group consisting of alkyl acrylates, wherein the alkyl group has 1 to 18 carbon atoms.

* * * * *